(12) United States Patent
Frenzel et al.

(10) Patent No.: US 10,457,120 B2
(45) Date of Patent: Oct. 29, 2019

(54) AIR OUTLET FOR ARRANGEMENT IN THE PASSENGER COMPARTMENT OF A MOTOR VEHICLE

(71) Applicant: GM GLOBAL TECHNOLOGY OPERATIONS LLC, Detroit, MI (US)

(72) Inventors: Thorsten Frenzel, Ruesselsheim (DE); Torsten Zimmermann, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 326 days.

(21) Appl. No.: 15/383,767

(22) Filed: Dec. 19, 2016

(65) Prior Publication Data
US 2017/0326951 A1    Nov. 16, 2017

(30) Foreign Application Priority Data
May 10, 2016 (DE) .................... 20 2016 002 951 U (51) Int. Cl.
*B60H 1/34* (2006.01)

(52) U.S. Cl.
CPC ......... *B60H 1/3428* (2013.01); *B60H 1/3435* (2013.01); *B60H 2001/3478* (2013.01)

(58) Field of Classification Search
CPC .................................................. B60H 1/3428
USPC ........................................................ 454/154
See application file for complete search history.

(56) References Cited

U.S. PATENT DOCUMENTS

| | | | | |
|---|---|---|---|---|
| 5,356,336 A * | 10/1994 | Stouffer | ................. | B60H 1/34 454/155 |
| 6,159,092 A * | 12/2000 | Elder | ................. | B60H 1/3421 454/152 |
| 6,533,655 B2 * | 3/2003 | Demerath | ............ | B60H 1/3421 454/155 |
| 7,455,581 B2 * | 11/2008 | Gehring | ............... | B60H 1/3428 454/155 |
| 9,902,237 B2 * | 2/2018 | Sano | ................... | B60H 1/3442 |

(Continued)

FOREIGN PATENT DOCUMENTS

| | | |
|---|---|---|
| DE | 202005002000 U1 | 4/2005 |
| DE | 102006053836 A1 | 5/2008 |

(Continued)

OTHER PUBLICATIONS

Schulz, DE102007019602B3 English machine translation, Jun. 26, 2008 (Year: 2008).*

(Continued)

*Primary Examiner* — Gregory L Huson
*Assistant Examiner* — Phillip Decker
(74) *Attorney, Agent, or Firm* — Lorenz & Kopf, LLP (57) ABSTRACT

An air outlet has an elongated housing including a flow channel. The air outlet has an outflow element which crosses the flow channel and is rigidly arranged on a longitudinal end of the housing. Furthermore, the air outlet has an insert which is pivotably mounted with an arched outer surface on a correspondingly formed arched section of an inner wall of the housing and is arranged offset to the outflow element in the longitudinal direction of the housing. The air outlet has an actuating element which protrudes into the flow channel, is pivotably mounted on the outflow element and is mechanically coupled to the insert.

14 Claims, 4 Drawing Sheets

(56) References Cited

U.S. PATENT DOCUMENTS

| | | | |
|---|---|---|---|
| 2002/0081965 A1* | 6/2002 | Demerath | B60H 1/3421 454/254 |
| 2011/0217914 A1* | 9/2011 | Marutschke | B60H 1/3428 454/152 |
| 2011/0250830 A1* | 10/2011 | Steinbeiss | B60H 1/3442 454/154 |
| 2014/0120823 A1* | 5/2014 | Brinas | B60H 1/34 454/155 |
| 2015/0202946 A1* | 7/2015 | Inagaki | B60H 1/3428 454/154 |
| 2016/0031293 A1* | 2/2016 | Brinas | B60H 1/34 454/152 |
| 2016/0288624 A1* | 10/2016 | Albin | B60H 1/3421 |
| 2017/0259649 A1* | 9/2017 | Shibata | B60H 1/3421 |
| 2018/0086182 A1* | 3/2018 | Gareis | B60H 1/3421 |
| 2018/0126824 A1* | 5/2018 | Demerath | B60H 1/3428 |
| 2018/0126825 A1* | 5/2018 | Lee | B60H 1/3428 |
| 2018/0283729 A1* | 10/2018 | Terasawa | F24F 13/1413 |

FOREIGN PATENT DOCUMENTS

| | | | |
|---|---|---|---|
| DE | 102007019602 B3 | 6/2008 | |
| DE | 102008044497 B3 * | 9/2009 | B60H 1/3442 |
| DE | 102009021663 A1 | 12/2009 | |
| DE | 102008050180 A1 | 4/2010 | |
| DE | 202010008054 U1 | 10/2010 | |
| EP | 1712384 A2 | 10/2006 | |
| GB | 1407992 A | 10/1975 | |
| KR | 100633928 B1 * | 10/2006 | |

OTHER PUBLICATIONS

Lee, KR 10-0633928 B1 English machine translation, Oct. 4, 2006. (Year: 2006).*

* cited by examiner

AIR OUTLET FOR ARRANGEMENT IN THE PASSENGER COMPARTMENT OF A MOTOR VEHICLE

CROSS-REFERENCE TO RELATED APPLICATION

This application claims priority to German Patent Application No. 202016002951.8, filed May 10, 2016, which is incorporated herein by reference in its entirety.

TECHNICAL FIELD

The present disclosure pertains to an air outlet, especially for arrangement in the passenger compartment of a motor vehicle.

BACKGROUND

Several air outlets which are individually adjustable are typically arranged in the passenger compartment of a motor vehicle. The outlets are flow-connected to a fan of a heating, venting and/or air-conditioning system. Air outlets are usually integrated in a dashboard. They are typically manually adjustable in order to allow changing the air flow moving through the outlet concerning its intensity, outflow characteristics and/or the direction as required.

It is desirable for especially simple and intuitive operation to provide as few actuating or operating elements as possible on an air outlet, by which the intensity of the air flow as well as its direction can be adjusted as required.

Accordingly, there is a need to provide an air outlet with as few actuating elements as possible for setting the flow characteristics and the flow direction, which outlet offers easy and intuitive operation and has an especially appealing design, which thus can be integrated as harmonically as possible in the visual design of a dashboard in the passenger compartment of the motor vehicle. There is an addition need to allow for adjusting and changing the direction, the intensity and also the outflow characteristics of the air outlet with one single actuating or operating element, if possible. The air outlet should be optimized by taking weight and production cost aspects into account. It should further include as few components as possible.

SUMMARY

In accordance with the present disclosure, an air outlet is provided which can typically be arranged in the passenger compartment of a motor vehicle, e.g. it can be integrated in a dashboard in the passenger compartment of the motor vehicle. The air outlet has an elongated housing with a flow channel. The elongated housing thus forms a flow channel for supplied air that flows into the passenger compartment. The elongated housing predetermines a basic flow direction through its geometry, e.g. a substantially hollow-cylindrical basic geometry, for the outgoing air flowing through the air outlet.

The air outlet further includes an outflow element which crosses the flow channel and is rigidly arranged on one longitudinal end of the housing. The outflow element can be formed as a decorative element for example. The outflow element can form a downstream outlet end of the flow channel, i.e. the housing of the air outlet. The air outlet further includes an insert, which is pivotably mounted with a curved outer surface on a correspondingly formed arched section of an inner wall of the housing and is arranged offset in relation to the outflow element in the longitudinal direction of the housing.

The insert is thus disposed in the longitudinal direction spaced from the outflow element. The insert is situated in every position completely within the housing and thus also completely within the flow channel. The pivotable bearing of the insert allows needs-based orientation of the air flowing through the flow channel. The air, which flows through the housing and through the flow channel, is changed in its direction of flow according to the position of the insert relative to the housing.

The air outlet further includes an actuating element which protrudes into the flow channel and is pivotably mounted on the outflow element, the actuating element being mechanically coupled to the insert. The mechanical coupling of actuating element and insert is provided in such a way that through an actuation of the actuating element, e.g. as a result of a pivoting movement of the actuating element relative to the outflow element, the insert is subjected to a similar pivoting movement relative to the housing.

The actuating element is typically arranged in an approximately central manner, i.e. in the case of a circular geometry of the outflow element approximately radially centrically on the outflow element. The actuating element and the thus mechanically coupled insert are typically pivotably mounted on the housing or on the outflow element with respect to several rotational degrees of freedom.

Since the insert is arranged axially and longitudinally offset in relation to the outflow element in the interior of the housing, a consistently constant appearance of the air outlet is obtained, apart from a variable position of the actuating element and irrespective of the respective orientation or pivoting position of the insert relative to the housing. Furthermore, the insert is covered at least in some sections by the outflow element which is arranged downstream in relation thereto. Its function and its respective pivoting position can be seen by the user only within limits.

At the same time, the outflow element which is fixedly arranged on the housing is used as a fastening base, i.e. as a counter-bearing for the actuating element which is pivotably arranged thereon. The mechanical coupling of actuating element and insert is decoupled from the geometrical and functional configuration of the outflow element. It is thus ensured to selectively provide the air outlet with different outflow elements in order to provide the air outlet with a variable, appropriate appearance according to the respective design of the passenger compartment of the motor vehicle. The selection of an outflow element has no influence on the function, especially the mechanical coupling of the insert and actuating element. Different outflow elements which can selectively be arranged on the housing merely need to include one and the same interface in form of a counter-bearing that is always formed in the same manner for the actuating element that is mounted thereon.

According to a further embodiment, the actuating element protrudes with an actuating end from the outflow element. It is further coupled to the insert by an opposite adjusting end. The actuating end and the adjusting end form opposite end sections of the actuating element. In this respect, the actuating element protrudes with an end section from the outflow element. It can thus be operated in an especially simple and intuitive manner.

The opposite adjusting end on the other hand is coupled to the insert in such a way that an adjusting movement of the actuating end is transferred to the insert in an approximately parallel or similar way. Pivoting of the actuating end which is directed to the left as viewed by the user leads to an opposite pivoting of the adjusting end, i.e. pivoting directed to the right, as a result of the pivotable bearing on the outflow element. The adjusting end is coupled to the insert in such a way however that the insert is entirely pivoted to the left. The same also relates to pivoting movement to the right or to the top and/or bottom. This results in an especially simple and intuitive operation of the air outlet.

According to a further development, the actuating element includes a bearing section which is pivotably and rotatably arranged on a counter-bearing section of the outflow element. The bearing section can be formed as a spherical section for example which is pivotably arranged in the counter-bearing section of the outflow element which is formed as a ball socket.

A bearing of the actuating element on the outflow element which is formed in the manner of a ball bearing allows pivoting capability of the actuating element in all directions relative to the outflow element or relative to the housing. At the same time, mounting or bearing of the actuating element in the manner of a ball bearing also allows a rotational movement of the actuating element with respect to a rotational axis extending through a longitudinal axis of the actuating element. In this respect, the actuating element, and its actuating end in particular, is not only randomly pivotable in relation to the outflow element, but is also rotatably arranged on the outflow element with respect to its longitudinal axis.

The pivotable bearing of the actuating element on the outflow element is used for a resulting pivoting and alignment of the air-guiding insert of the air outlet. At the same time or also independently therefrom, the actuating element can be rotatably coupled with at least one throttle, by which an air-mass flow flowing through the air outlet can be regulated or throttled.

The arrangement of the actuating element on the outflow element in the manner of a ball bearing provides an especially intuitive, joystick-like actuation and handling of the actuating element.

According to a further embodiment, the actuating element penetrates the outflow element in the longitudinal direction. The adjusting end and the actuating end of actuating element thus lie on different sides of the outflow element. With respect to a direction of flow of the air predetermined by the geometry of the flow channel, the actuating end is typically disposed downstream of the outflow element, whereas the adjusting end is disposed upstream of the outflow element.

Since the actuating element penetrates the outflow element in the longitudinal direction, i.e. more or less in parallel to the progression of the flow channel, and since the adjusting element is formed in a longer manner than the actuating end for example, a kind of lever effect can be provided. A comparatively short adjusting path of the actuating end can thus lead to a comparatively long adjusting path of the adjusting end.

According to a further embodiment, the adjusting end of the actuating element rests on a rear end of the insert. The rear end of the insert is offset in the longitudinal direction in relation to the outer surface of the insert. In other words, the rear end of the insert is situated upstream in relation to the outer surface of the insert, via which the insert is rotatably or pivotably mounted in the housing. By mechanically coupling the actuating element exclusively with the rear end of the insert, a substantially parallel and identical pivoting direction of the actuating element and insert is obtained as a result of a pivoting movement of the actuating end of the actuating element relative to the outflow element.

When viewed in the longitudinal axial direction, the outer surface of the insert is disposed between the rear end of the insert and the bearing of the actuating element on the outflow element. This leads to a pivoting and adjusting movement of the insert and the actuating element which is identical or acts in the same direction. The direction of the air flow can thus be adjusted in an especially simple and intuitive manner.

According to a further embodiment, the insert includes at least one air-guiding fin which is rigidly connected to the outer surface of the insert. The insert can especially be formed as a plastic injection-molded part. It can include several fins which extend in a star-shaped or radial manner and which focus the air flow for example according to the specific geometric configuration. The fins can be formed or oriented in a parallel or radially symmetric manner with respect to each other concerning the main direction of flow. Pivoting of the entire insert thus leads to a respective pivoting of the air-guiding fin(s).

According to a further embodiment, the insert includes an inner ring which is concentric in relation to the annular outer surface. The inner ring can be connected especially via several air-guiding fins to the outer surface. The insert can thus include an annular outer section which is provided at least in some sections with the spherical or spherical-segment-shaped outer surface. The outer section of the insert can be formed in the form of a closed ring. Individual or several air-guiding fins which are arranged in a distributed manner over the inner circumference of the outer section can be connected to the inner ring or form a connection between inner ring and outer section.

The inner ring and the outer section of the insert can respectively be formed in a substantially closed and circular manner. At least one of the inner ring and outer section can also act as an air-guiding annular fin. The outer surface of the outer section, when viewed in the longitudinal direction, can have a convex geometry and a spherical-segment-like geometry relating to the circumferential direction, which corresponds to a ball-socket-shaped geometry of the arched section of the inner wall of the housing.

The insert is subdivided into several air-guiding segments at least by the air-guiding fins and the inner ring, which segments have a predetermined extension in the longitudinal direction in order to guide the air flow according to the respective orientation position of the insert relative to the housing in a direction corresponding to the insert.

According to a further embodiment, the insert includes an elongated hollow-cylindrical shaft. The hollow-cylindrical shaft can especially adjoin the inner ring. As a result, the inner ring can also coincide with the hollow-cylindrical shaft. The hollow-cylindrical shaft typically has a greater longitudinal extension than the outer section of the insert or the outer surface of the insert. The downstream ends of the air-guiding fins, the outer section and/or the inner ring or the hollow-cylindrical shaft can be disposed in a common cross-sectional plane which extends substantially perpendicularly to the longitudinal direction of the housing or the flow channel in a neutral position of the insert.

The upstream end of the hollow-cylindrical shaft protrudes in the longitudinal direction from the upstream end of the outer section. The adjusting end of the actuating element interacts especially with the shaft of the insert. As a result of the different longitudinal extension of shaft and outer section, an axial offset of the rear end of the insert and the outer surface of the insert is achieved.

According to a further embodiment, the actuating element rests on an inner side of the shaft. The adjusting end of the actuating element typically protrudes from the downstream end into the shaft of the insert. The inner cross-section of the shaft is preferably formed according to the outer contour of the adjusting end of the actuating element, so that any movement of the actuating element and its adjusting end directly leads to a respective adjusting movement of the shaft and the entire insert.

According to a further embodiment, the actuating element includes a longitudinally extending rod section, via which the actuating end is connected to the adjusting end. The actuating element can be formed in an integral manner. The actuating end, the adjusting end and the interposed rod section can thus be formed in an integral manner and thus be regarded as sections of the actuating element. It is typically provided that the rod section has a greater longitudinal extension than the actuating end of the actuating element which protrudes from the outflow element. A comparatively small adjusting movement of the actuating element thus leads to a greater adjusting movement of the adjusting end of the actuating element.

According to a further embodiment, the rod section protrudes into the shaft. Furthermore, a contact ring is connected at the adjusting end via at least one web to the rod section. A circularly continuous mutual contact of rod section and hollow-cylindrical shaft as well as a respective circumferential mutual contact of actuating element and insert can be provided by the contact ring. The contact ring typically extends in a plane extending perpendicularly to the rod section. The rod section typically extends parallel to the cylindrical geometry of the shaft.

The outer circumference of the contact ring typically corresponds to an inner circumference or inner cross-section of the shaft. The outer cross-section of the contact ring is formed according to the inner diameter of the shaft. As a result, any pivoting movement of the actuating element and thus any adjusting movement of the rod section and its contact ring can be transferred directly and without play to a respective adjusting and pivoting movement of the shaft of the insert.

Air can flow through the interior of the shaft because the contact ring is connected to the rod section via at least one web, preferably several thereof, which are arranged in a distributed manner over the inner circumference of the contact ring.

According to a further embodiment, the contact ring rests in a sliding manner on the inner side of the shaft. Since the insert is arranged in an offset manner in relation to the outflow element in the longitudinal direction, pivot or swivel points of the actuating element on the one hand and the insert on the other hand are also obtained, which pivot or swivel points are arranged offset in relation to each other in the longitudinal direction. An axial offset of the pivotable bearing of the actuating element for the pivotable bearing of the insert requires length compensation between the actuating element and the shaft. Since the contact ring rests in a sliding manner on the inner side of the shaft, such length compensation is provided. The inner side of the hollow-cylindrical shaft is formed as a smooth inner surface, along which the contact ring slides with the lowest possible friction.

According to a further embodiment of the air outlet, the inner wall of the housing includes a radially outwardly extending inclined section, adjacent in the longitudinal direction to the arched section and the outflow element. Such an inclined section can especially act as an extension of the outer section of the insert when the insert, originating from a neutral position, is maximally pivoted to the side, to the top or bottom, or in a combined vertical and/or horizontal manner. The inclined section of the inner wall of the housing, which expands radially to the outside and in the direction of flow, proves to be advantageous with respect to the configuration of the flow and for an intended orientation of the air flow, which is free from swirling to the highest possible extent.

According to a further embodiment, the adjusting end of the actuating element is coupled via at least one swivel joint and length compensation to a throttle arranged upstream in the flow channel. The swivel joint can be formed in the manner of a universal joint for example. It can further be considered to provide at least two swivel joints which are arranged in an axially offset manner with respect to each other or offset in the longitudinal direction, and which are connected to each other for example via the length compensation.

Length compensation is required due to the pivotable bearing of the actuating element. Depending on the pivoting position of the actuating element, different radial positions of the adjusting end are obtained with respect to a central axis of the housing or the flow channel. By the at least one swivel joint, and preferably by at least two thereof, and the rotatable bearing of the actuating element on the outflow element, a shaft which is in operative connection with the throttle can be implemented, by which the throttle is movable between a closed position and an open position. The throttle can be adjusted and triggered via a rotational movement of the actuating element with respect to a rotational axis extending in the longitudinal direction through the actuating element.

Both the direction, the intensity and also the outflow characteristics of the air outlet can finally be set and changed as required by only one single actuating or operating element. The air outlet can thus be optimized under aspects concerning the weight and the production costs.

The multifunctional implementation of the actuating operating element further allows a reduction in the number of components.

Accordingly, a motor vehicle is further provided which includes at least one previously described the air outlet in its passenger compartment.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
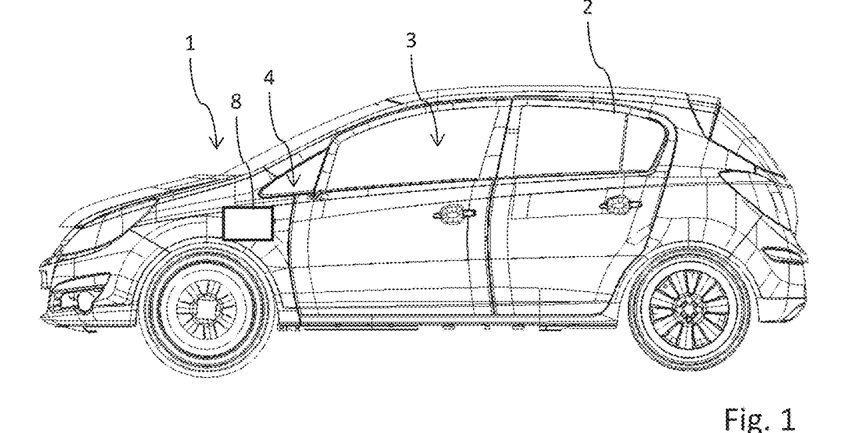
FIG. 1 shows a motor vehicle in a side view.
Figure 2:
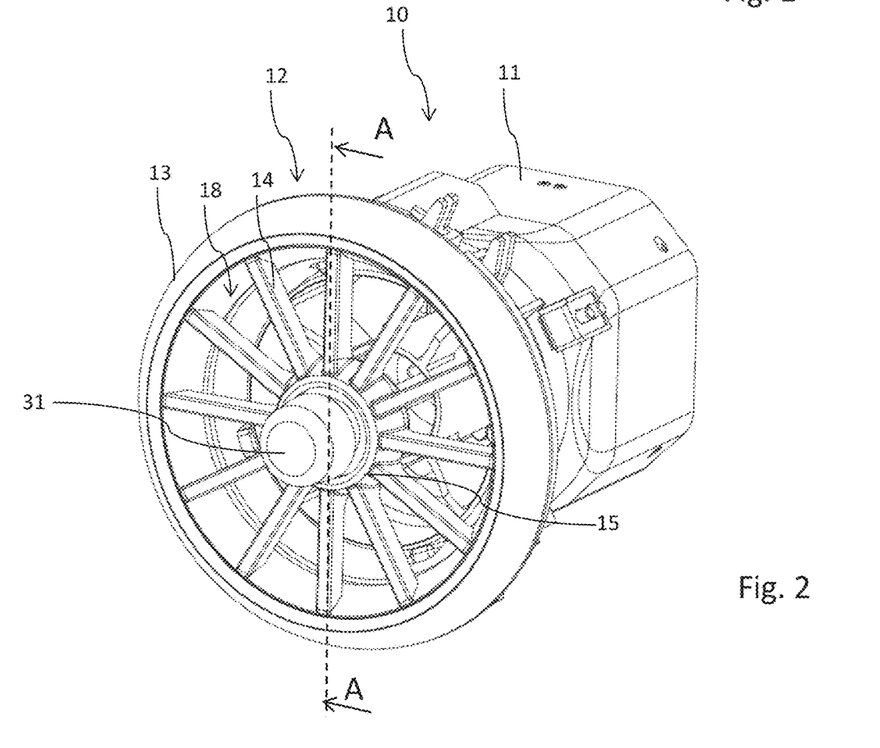
FIG. 2 shows a perspective view of an air outlet which can be arranged in the passenger compartment of the motor vehicle.

The motor vehicle 1 schematically shown in FIG. 1 includes a self-supporting car body 2 and a passenger compartment 3 acting as a passenger cell. Several seats for passengers are provided in the passenger compartment 3. Several air outlets 10, which are shown in FIG. 2 in a perspective view, are arranged in the passenger compartment 3 in the region of a dashboard 4, which is merely indicated in FIG. 1. The air outlet 10 includes a housing 11, which forms a flow channel 5 for air supplied by the fan 8 for example.

The air outlet 10, which is shown in FIGS. 2 to 6 in its basic position, includes an outflow element 12 on its outlet side, i.e. at its downstream end 6. The outflow element 12 is formed in the present case as a type of spoke rim. It includes an approximately annular rim section 16 which corresponds to the inner geometry of the housing 11 and from which several webs 14 extend radially to the inside.

The inner ends of the webs 14 are connected to each other via a counter-bearing 15. The counter-bearing 15 is situated approximately centrically within the rim section 16. It acts more or less as a hub of the spoke rim. In the mounted position shown in FIG. 2, the counter-bearing 15 is disposed approximately radially in the center in an outflow surface 18 of the air outlet 10. A longitudinally extending actuating element 30 is pivotably mounted on the counter-bearing section 15, as shown from a comparison of FIGS. 3 and 7.

The actuating element 30 includes an actuating end 31 which protrudes from an outer side of the outflow element 12. It is provided according to the cross-sectional view according to FIG. 3 with an actuating button 32. The actuating element 30 includes a bearing section 33 adjacent to its actuating end 31, which bearing section is pivotably mounted in the counter-bearing section 15 of the outflow element 12 and can accordingly be pivoted in any direction in relation to the outflow element 12. The actuating element 30 includes a longitudinally extending rod section 34 in extension of the actuating end 31, but on an opposite, inwardly facing side of the bearing section 33.

A radially expanded contact ring 35 is arranged on an adjusting end 37 of the actuating element 30 which faces away from the actuating end 31. The contact ring 35 is connected to the rod section 34 via several radially extending webs 36.

Figure 3:
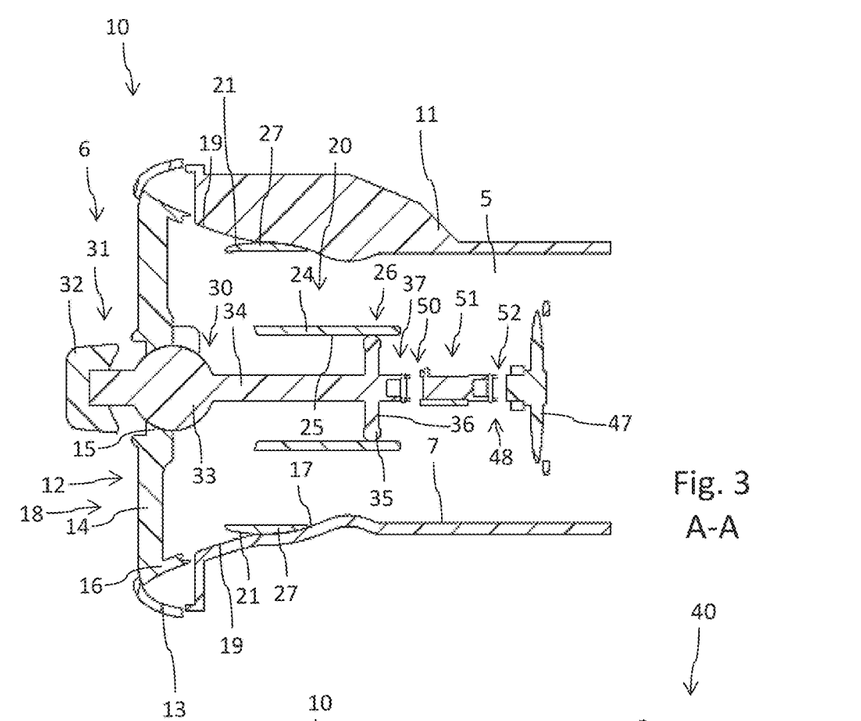
FIG. 3 shows a longitudinal cross-sectional view through the air outlet according to FIG. 2 along A-A.

As is shown in FIG. 3, the rod section 34, and therefore the adjusting end 37, has a greater longitudinal extension than the actuating end 31 of the actuating element 30. Since the actuating element 30 penetrates the outflow element 12 in the longitudinal direction, i.e. in the direction of the flow channel 5, and is pivotably mounted on the outflow element 12 in the region of the bearing section 33 which is situated comparatively close to the actuating end 31, a comparatively small pivoting movement or adjusting movement of the actuating end 31 leads to a relatively big adjusting or pivoting movement of the adjusting end 37.

The bearing section 33 can especially be formed as a spherical section. The counter-bearing section 15 of the outflow element 12, which is formed in a corresponding manner thereto, can include a ball socket. The actuating element 30 can thus be pivoted in any radial direction with respect to the longitudinal extension of the housing 11. Furthermore, a rotatable bearing of the actuating element 30 with respect to a rotational axis can be provided by the ball-bearing-like connection of the actuating element 30 to the outflow element 12, which rotatable bearing coincides with the longitudinal axis of the actuating element 30.

The outflow element 12 substantially acts in the present case as a design or decorative element. It can have a spoke-like or wheel-like geometry, as shown in the drawings. Completely different air-permeable geometrical shapes for the outflow element 12 can also principally be considered. The outflow element 12 can be fixed by a circumferential annular rim 13 to the longitudinal end 6 of the housing 11 of the air outlet 10. It can be fixed via a snap-on connection by the ring 13 to the housing 11.

The air outlet 10 further includes an insert 20 which is pivotably mounted by an arched outer surface 21 on a correspondingly formed arched section 17 of an inner wall 7 of the housing 11. The insert 20 is arranged in an offset manner in relation to the outflow element 12 in the longitudinal direction of the housing 11. The insert 20 is situated completely and independently of its respective swivel position within the housing 11. The outflow element 12 acts as a kind of a baffle for the insert 20, which thus does not protrude from the longitudinal end 6 of the housing 11.

The insert 20 is used as an air guide element. An air flow guided through the flow channel 5 is guided in a respective direction according to the respective orientation and position of the insert. In the neutral or zero position shown in FIG. 3, the insert is oriented substantially parallel to the housing 11. In comparison, the insert 20 is pivoted downwardly in FIG. 7. The air guided through the air outlet 10 is guided by the downwardly pivoted insert 20 via the outflow surface 18 in a downwardly directed manner into the passenger compartment 3.

Figure 7:
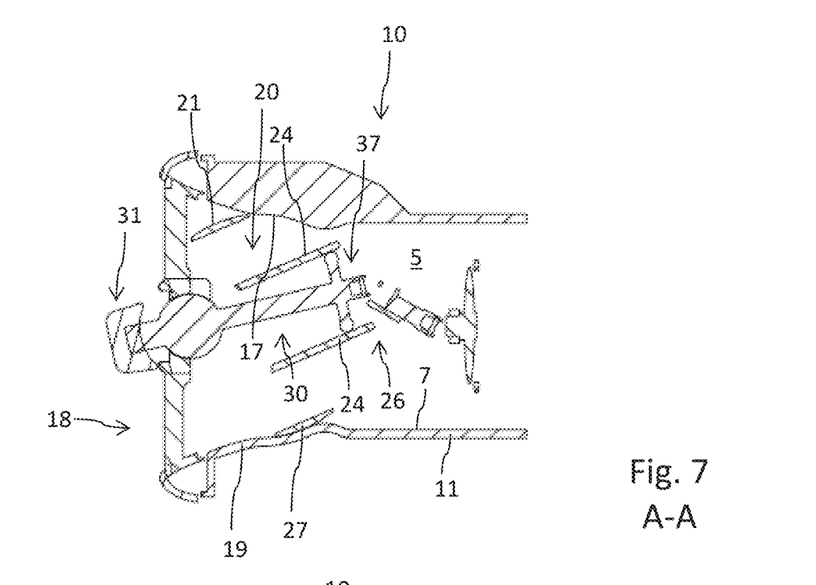
FIG. 7 shows a further cross-sectional view A-A according to FIG. 2, but with a downwardly pivoted insert.
Figure 8:
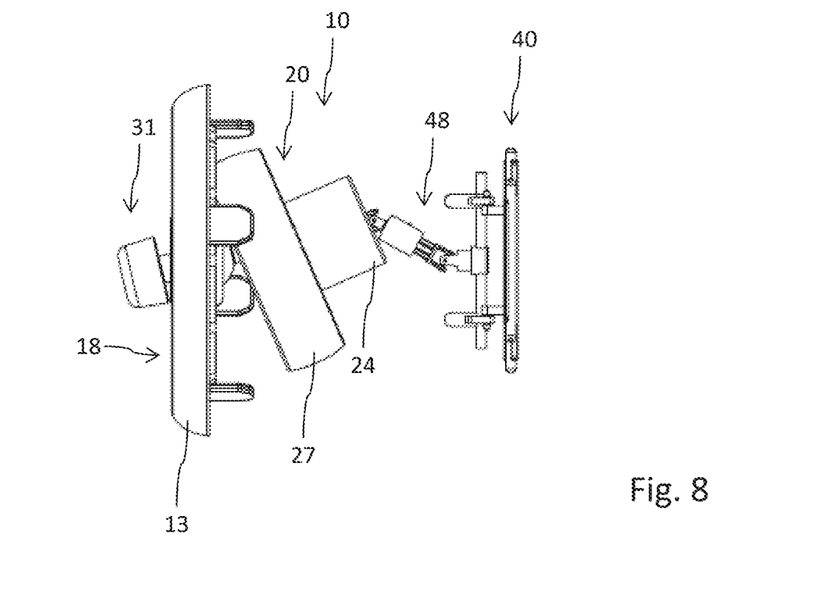
FIG. 8 shows a side view of the air outlet in the configuration according to FIG. 7, but without the housing.

The outer surface 21 of the insert is curved in a convex manner in the cross-sectional view according to FIGS. 3 and 7. It is formed on the inner wall 7 of the housing 11 in a manner corresponding to the concavely curved arched section 17. The arched section 17 and the outer surface 21 which is formed in a corresponding manner can also be formed in the manner of a ball segment. The arched section 17 can be formed at least in sections in the manner of an articular cavity or ball socket, whereas the outer surface 21 is formed in the manner of a ball segment.

The mutually adjusted geometric shape of the outer surface 21 and the arched section 17 enables a random pivoting capability of the insert 20 in relation to the rigid housing 11.

Figure 4:
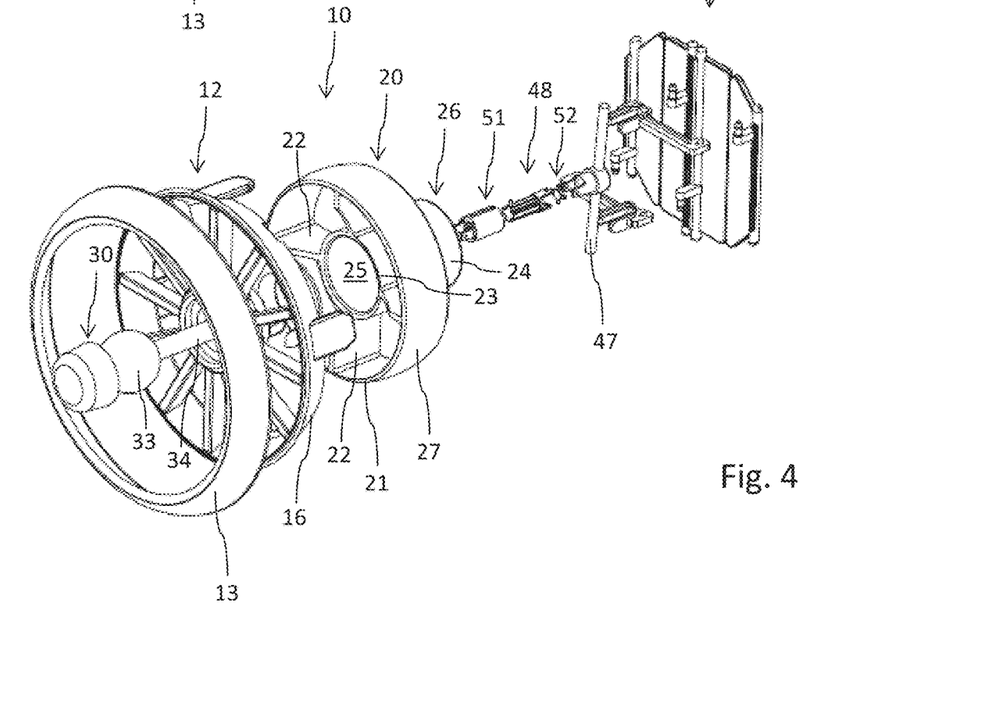
FIG. 4 shows an exploded view of the components arranged in or on the housing of the air outlet according to FIG. 2.
Figure 5:
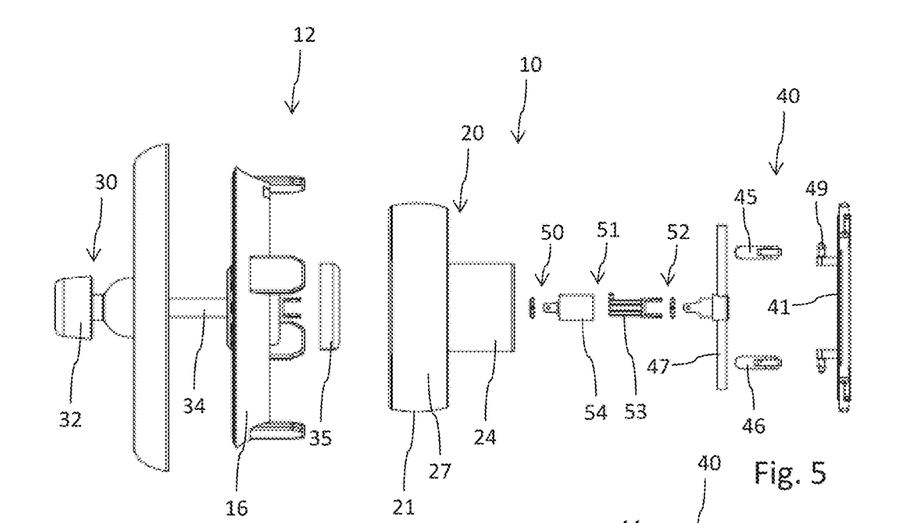
FIG. 5 shows a side view of the components shown in FIG. 4.
Figure 6:
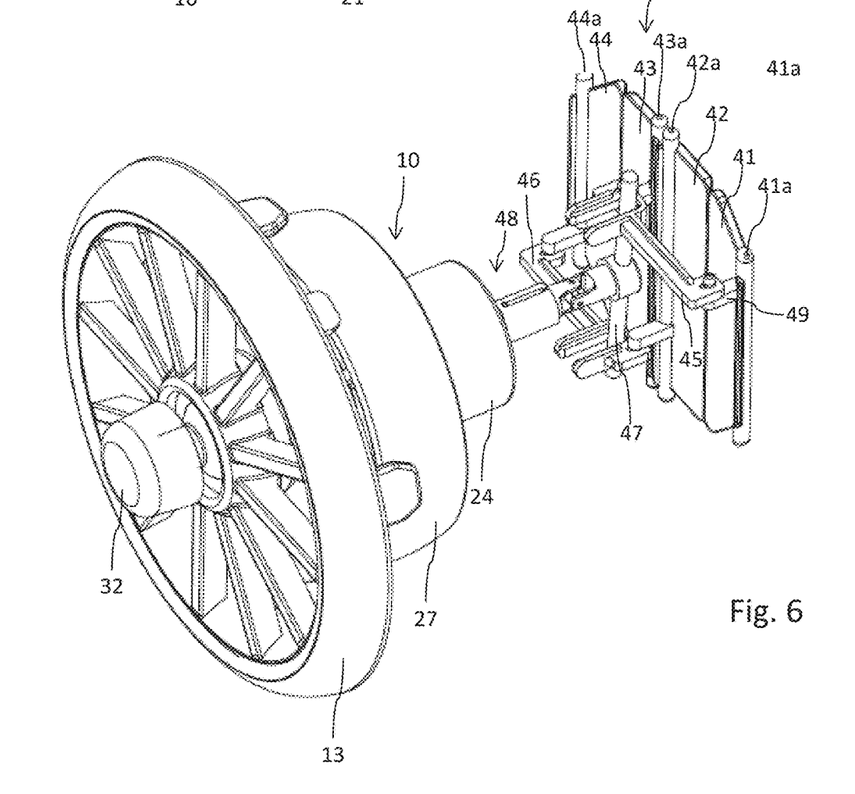
FIG. 6 shows a perspective view of the components arranged in the housing of the air outlet the final mounting position.

As is illustrated by reference to FIGS. 3 and 4, the insert 20 includes an annular outer section 27, on the exterior side of which the aforementioned outer surface 21 is formed. An inner ring 23 is provided concentrically in relation to the outer section 27. The inner ring 23 and the outer section 27 are rigidly connected to each other via several radially oriented fins 22. The fins 22, the outer section 27 and optionally also the inner ring 23 have a predetermined extension in the longitudinal direction, i.e. in the axial direction, so that a required air guiding effect can be provided.

It is especially provided that the inner ring 23 coincides with a longitudinal extending shaft 24, which has a greater longitudinal extension than the outer section 27. The shaft 24, which is formed in a hollow-cylindrical manner, can especially form a rear end 26 of the insert 20 which faces away from the outflow element 12. The contact ring 25 of the actuating element 30 is in contact position on an inner side 25 of the shaft 24. The contact ring 35 is guided in an especially sliding manner on the smooth inner side 25 of the shaft 24. The inner cross-section of the shaft 24 substantially corresponds to the outer cross-section of the contact ring 35.

A cooperation of insert 20 and actuating element 30 is now illustrated by reference to FIGS. 3 and 7. If the actuating end 31, as shown in FIG. 7, is pivoted downwardly starting from the neutral position in FIG. 3, the adjusting end 37 of the actuating element 30 moves upwardly in an opposite direction. Since the rear end 26 of the insert 20, which is mechanically coupled to the actuating element 30, is located axially or offset in the longitudinal direction to the outer surface 21 or to the outer section 27 of the insert 20, only a rear end 26 of the insert which faces away from the actuating end 31 is subjected to an upwardly directed adjusting movement.

As a result of the pivotable bearing of the outer section 27 on the housing 11, which outer section is disposed between the adjusting end 37 and the bearing sections 33, the insert is subjected in its entirety to a downwardly directed pivoting movement which substantially corresponds to the pivoting movement of the actuating end 31.

Since mechanical coupling of the actuating element 30 to the insert 20 occurs in an axially offset manner in relation to the pivotable bearing of the insert 20 on the housing 11 and on a side of the insert facing away from the actuating end 31, a similar pivoting movement of actuating element 30 and insert 20 is obtained. The insert 20 thus directly follows any pivoting movement of the actuating element 30.

FIG. 3 further shows that the housing 11, which is substantially formed in a hollow-cylindrical manner, includes an inclined section 19 adjacent to the arched section 17 in the longitudinal direction and to the outflow element 12, which inclined section expands radially to the outside. The inclined section 19 is oriented in the extreme position according to FIG. 7 of the insert 20 in an approximately aligned manner in relation to the orientation of the outer section 27 and the air guide element formed thereby.

In an end position, which is shown for example in FIG. 7 and is directed downwardly, a substantially swirl-free flow is obtained for the air flowing out of the air outlet 10. The inclined section 19 is typically formed in a radially symmetrical way. It can be regarded as a kind of conical expansion of the inner wall 7 in relation to the outflow surface 18.

A throttle 40 is provided upstream of the insert 20 for throttling the air flow. It includes several fins 41, 42, 43, 44 according to the illustrations of FIGS. 5 and 6, which fins extend in parallel with respect to each other and are respectively pivotably arranged on the housing 11. The fins 41, 42, 43, 44 are pivotably arranged in the cross-section of the housing 11 with respect to a rotational axis 41a, 42a, 43a, 44a.

The adjusting end 37 of the actuating element 30 is connected to a first joint 50, which is connected in a length-compensating manner to a second joint 52. The length compensation 51 between the first joint 50 and the second joint 52 can be provided for example by a torque-transmitting, but longitudinally displaceable coupling of a shaft 53 in a receiver 54 which corresponds thereto. The first joint 50 and the second joint 52 are connected to each other in a torque-proof manner via the length compensation 51.

Each of the joints 50, 52 can be formed as a kind of universal joint for example. The two joints 50, 52 with the interposed length compensation 51 form a shaft 48 which is coupled to the actuating element 30 in a torque-proof manner.

A control rod 47 is arranged on a longitudinal end of the shaft 48, which control rod extends in two opposite directions radially to the outside. The opposite ends of the control rod 47 are each coupled to a driver 45, 46. The drivers 45, 46 extend approximately horizontally in the illustration according to FIG. 6. Originating from the control rod 47, the upper driver 45 extends to the right; originating from the control rod 47 the bottom driver extends in the opposite direction to the upper driver, i.e. to the left.

A rotational movement of the control rod 47, which is directed in a clockwise manner and is caused by a respective rotational movement of the actuating element 30 relative to the outflow element 12 or relative to the housing 11, leads to a mutually opposite horizontal displacing movement of the two drivers 45, 46. The drivers are pivotably coupled in pairs to the fins 41, 43 and 42, 44.

An extension arm 49 is thus arranged on the fin 41, which extension arm extends radially to the rotational axis 41a and which is pivotably connected to the upper driver 45. During a deflection of the upper driver 45 in the horizontal direction, the coupling to the extension arm 49 leads to a pivoting movement of the fin 41 with respect to its longitudinal axis 41a.

In the present embodiment, the upper driver 45 is coupled via the extension arm 49 to the fin 41 and via a further extension arm (not shown in closer detail) to the further fin 43. The same applies to the bottom driver 46 with respect to the two fins 42, 44. Finally, an oppositely directed displacing movement of the two drivers 45, 46 leads to the pivoting of all fins 41, 42, 43, 44 and thus to a closure or opening of the flow channel 5.

As a result, the air-mass flow, which flows through the housing 11 and the flow channel 5, can also be regulated and throttled by the torque-transmitting coupling of the actuating element 30 to the control rod 47.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An air outlet, comprising:
   an elongated housing having a flow channel;
   an outflow element crossing the flow channel and rigidly arranged on a longitudinal end of the housing;
   an insert pivotably mounted with an arched outer surface on a correspondingly formed arched section of an inner wall of the housing and arranged offset to the outflow element in the longitudinal direction of the housing;
   an actuating element that protrudes into the flow channel pivotably mounted on the outflow element and mechanically coupled to the insert, the actuating element protrudes with an actuating end from the outflow element and is coupled to the insert with an opposite adjusting end; and a throttle arranged upstream in the flow channel, the throttle coupled to the adjusting end via a first universal joint and a second universal joint, the first universal joint coupled to the second universal joint with a length compensation element, the second universal joint coupled to a control rod, the throttle including a plurality of fins each arranged parallel to each other and pivotably coupled to the housing, each fin of the plurality of fins having a rotational axis that is transverse to the longitudinal direction of the housing, each of the plurality of fins coupled to the control rod such that a rotation of the actuating element pivots each of the plurality of fins relative to the housing, with a first pair of the plurality of fins coupled to the control rod via a first driver and a second pair of the plurality of fins coupled to the control rod via a second driver, the control rod having a first end opposite a second end, the first end coupled to the first driver and the second end coupled to the second driver, the control rod extends along an axis that is transverse to the longitudinal direction of the housing, and the plurality of fins includes a first fin adjacent to a second fin, a third fin adjacent to a fourth fin, the second fin adjacent to the third fin, with the first driver coupled to the first fin and the third fin via at least one first extension arm and the second driver coupled to the second fin and the fourth fin via at least one second extension arm.

2. The air outlet according to claim 1, wherein the actuating element comprises a bearing section pivotably and rotatably arranged in a counter-bearing section of the outflow element.

3. The air outlet according to claim 2, wherein the actuating element penetrates the outflow element in the longitudinal direction, and wherein the adjusting end and the actuating end are disposed on different sides of the outflow element.

4. The air outlet according to claim 1, wherein the adjusting end rests on a rear end of the insert, which rear end is offset in the longitudinal direction in relation to the outer surface of the insert.

5. The air outlet according to claim 1, wherein the insert comprises at least one air-guiding fin which is rigidly connected to the outer surface.

6. The air outlet according to claim 1, wherein the insert comprises an inner ring which is concentric to the annular outer surface.

7. The air outlet according to claim 1, wherein the insert comprises a longitudinally extending hollow-cylindrical shaft.

8. The air outlet according to claim 7, wherein the adjusting end of the actuating element rests on an inner side of the shaft.

9. The air outlet according to claim 8, wherein the actuating element comprises a longitudinally extending rod section having an actuating end connected to the adjusting end.

10. The air outlet according to claim 9, wherein the rod section protrudes into the shaft and wherein a contact ring is connected on the adjusting end via at least one web to the rod section.

11. The air outlet according to claim 10, wherein the contact ring rests in a sliding manner on the inner side of the shaft.

12. The air outlet according to claim 1, wherein an inner wall of the housing comprises a radially outwardly extending inclined section, adjacent in the longitudinal direction to the arched section and the outflow element.

13. A motor vehicle, comprising:
at least one air outlet including:
an elongated housing having a flow channel;
an outflow element crossing the flow channel and rigidly arranged on a longitudinal end of the housing;
an insert pivotably mounted with an arched outer surface on a correspondingly formed arched section of an inner wall of the housing and arranged offset to the outflow element in the longitudinal direction of the housing;
an actuating element that protrudes into the flow channel pivotably mounted on the outflow element and mechanically coupled to the insert, the actuating element protrudes with an actuating end from the outflow element and is coupled to the insert with an opposite adjusting end; and
a throttle arranged upstream in the flow channel, the throttle coupled to the adjusting end via a first universal joint and a second universal joint, the first universal joint coupled to the second universal joint with a length compensation element, the second universal joint coupled to a control rod, the throttle including a plurality of fins each arranged parallel to each other and pivotably coupled to the housing, each fin of the plurality of fins having a rotational axis that is transverse to the longitudinal direction of the housing, a first pair of the plurality of fins is coupled to the control rod via a first driver and a second pair of the plurality of fins is coupled to the control rod via a second driver such that a rotation of the actuating element pivots each of the plurality of fins relative to the housing, the control rod having a first end opposite a second end and the first end is coupled to the first driver and the second end is coupled to the second driver, the control rod extends along an axis that is transverse to the longitudinal direction of the housing, and the plurality of fins includes a first fin adjacent to a second fin, a third fin adjacent to a fourth fin, the second fin adjacent to the third fin, with the first driver coupled to the first fin and the third fin via at least one first extension arm and the second driver coupled to the second fin and the fourth fin via at least one second extension arm.

14. The motor vehicle according to claim 13, wherein the rotation of the actuation element rotates the control rod to laterally translate the first driver and the second driver to pivot each of the plurality of fins relative to the housing.

* * * * *